May 17, 1966   W. WITTE ETAL   3,251,271
METHOD FOR PRODUCING SPLINED COUPLING SLEEVES
Original Filed Aug. 30, 1961

INVENTORS:
WOLFGANG WITTE
HANS JOACHIM SCHWERDHÖFER
BY
E. M. Squire
ATTORNEY

United States Patent Office 3,251,271
Patented May 17, 1966

3,251,271
METHOD FOR PRODUCING SPLINED COUPLING SLEEVES
Wolfgang Witte and Hans Joachim Schwerdhöfer, Schweinfurt (Main), Germany, assignors to Fichtel & Sachs A.G., Schweinfurt (Main), Germany, a corporation of Germany
Original application Aug. 30, 1961, Ser. No. 202,035. Divided and this application Jan. 25, 1965, Ser. No. 435,111
2 Claims. (Cl. 90—7.5)

This application is a division of our copending application Serial No. 202,035, filed on August 30, 1961.

The present invention relates to a method for simultaneously forming two sets of spline teeth on a workpiece. The method is particularly suitable for the production of an axially displaceable coupling sleeve for use in change speed hubs of the type illustrated in U.S. Patents Nos. 2,857,785 and 2,895,576.

This coupling sleeve replaces the usual drive dogs which selectively engage various portions of the planetary gear train for obtaining different gear ratios between the drive sprocket and the hub of the coaster brake. The sleeve is provided with a large number of fine spline teeth which selectively engage different internally toothed portions of the planetary gearing and a smaller number of coarse spline teeth which continuously engage the driving member driven by the sprocket wheel in all positions of axial displacement of the sleeve.

By so arranging the fine and coarse spline teeth that they have a common pitch circle diameter and that the product of the number of coarse teeth by their circumferential tooth spacing measured along the pitch circle is equal to the number of fine teeth multiplied by the pitch circle spacing of the fine teeth, both sets of teeth may be formed simultaneously in a single machining operation.

By providing a large number of fine spline teeth on a small diameter portion of the sleeve and a relatively small number of coarse spline teeth on a larger diameter portion of the sleeve, the operational stresses on the two sets of teeth are effectively equalized and are reduced in magnitude because of the large areas by which the operational stresses are borne. This feature also reduces wear.

Various objects, features and advantages of the invention will become apparent upon reading the following specification together with the accompanying drawing forming a part hereof.

Referring to the drawing.

Figure 1:
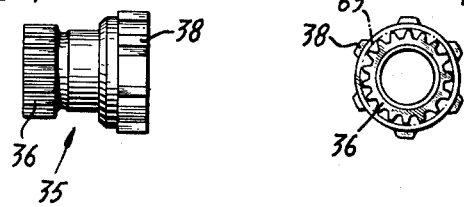
FIGURE 1 is a side view of a coupling sleeve produced in accordance with the method of the present invention.
Figure 2:
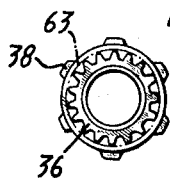
FIGURE 2 is an end view of the coupling sleeve of FIG. 1.
Figure 3:
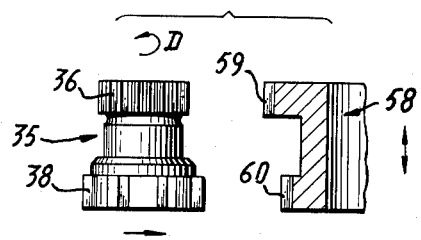
FIGURE 3 is a side view of the sleeve of FIGS. 1 and 2 including a partial sectional view of a cutting or broaching tool used in forming the sleeve, the cutting tool being shown withdrawn from the workpiece.
Figure 4:
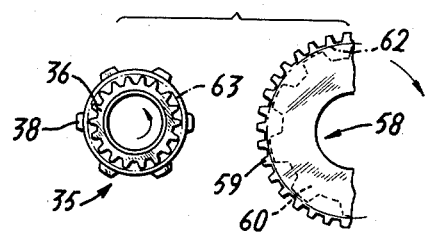
FIGURE 4 is a plan view of the workpiece and tool shown in FIG. 3.

Referring to FIGS. 3 and 4, the method of manufacture of the coupling sleeve 35 shown in FIGS. 1 and 2 is illustrated. Because the spline teeth 36 and 38 do not enter into meshing engagement with other external teeth like gear teeth, these teeth may be formed simultaneously in a single machining operation by means of a double tool. The teeth 36 and 38 are formed in a shaper or similar reciprocatory machine tool (not shown) by means of a broaching or similar revoluble and axially reciprocating cutting tool designated generally as 58.

The cutting tool 58 is formed as a double gear having a large diameter portion with fine teeth 59 and a small diameter portion with coarse teeth 60. The common pitch circle of all of the cutter teeth 59 and 60 is indicated at 62. The common pitch circle 62 of the cutting tool is of larger diameter than the common pitch circle of the spline teeth 36 and 38 of the coupling sleeve 35 which is indicated at 63. The pitch circles 62 and 63 define the circumferences of imaginary cylinders which, if placed in positive non-slipping frictional rolling contact with each other, would be the exact equivalents of meshing gear teeth from the standpoint of effective speed ratio. In other words, the pitch circles are circles the diameters of which are the same as the diameters of a pair of friction gears which would replace the toothed gears.

In the example illustrated, the pitch circle spacing of the fine teeth 36 is 1 unit, measured circumferentially of the pitch circle between the radially extending center lines of adjacent teeth. Similarly, the pitch circle spacing of the coarse teeth 38 is 3 units. The number of fine teeth 36 is 18 so that the product of the number of teeth multiplied by the spacing is 18. The coarse teeth 38 are six in number so that, again, the product of the number of teeth by the tooth spacing is 18.

Referring to FIG. 5, the diameter of the pitch circle 62 of the cutting tool 58 is twice as great as the diameter of the common pitch circle 63 of the spline teeth 36 and 38 of the coupling sleeve 35. This involves a 2:1 speed ratio assuming theoretical frictional contact between imaginary cylinders of pitch circle diameters. The cutting tool 58, therefore, has twice as many of each type of tooth as the sleeve 35. Accordingly, the product of the pitch circle spacing and the number of fine cutting teeth 59 is 36. The total number of fine cutting teeth 59 is 36 which is twice the number of fine spline teeth 36. Similarly, there are twelve coarse cutting teeth 60. Since the pitch circle spacing between coarse cutting teeth is three units, the product of the number of coarse cutting teeth 60 and the pitch circle spacing is 36 as in the case of the fine cutting teeth 59.

In the example illustrated, the fine spline teeth 36 lie generally within the small pitch circle 63 and the coarse spline teeth 38 lie generally outside of the pitch circle 63. By using a larger pitch circle for the cutting tool 58, the fine cutting teeth 59 lie generally outside the cutter pitch circle 62 and the coarse cutting teeth 60 lie inside the large pitch circle 62. This relationship permits both sets of spline teeth 36, 38 to be cut simultaneously by the single cutting tool 58. During the cutting operation, the workpiece and cutting tool are simultaneously rotated in opposite directions so that the peripheral velocities of he two pitch circles 62 and 63 are identical. It is to be understood that, during the cutting operation, there is no meshing engagement between the teeth of the cutting tool and the teeth of the workpiece as there would be between the cooperating teeth of two gears. However, there must be the equivalent of non-slipping rolling contact between two imaginary cylinders of diameters equal to the diameters of the pitch circles 62 and 63 of the cutting tool 58 and the sleeve or workpiece 35, respectively. This requires that the angular velocity of the workpiece 35 be exactly twice the angular velocity of the tool 58 during the cutting operation. This is readily accomplished by appropriate separate drive gearing (not shown) or other suitable means.

It is apparent from an inspection of FIG. 4, that the finished sleeve 35 is wholly unsuited for meshing engagement with the cutting tool 58 to form driving and driven gears. The teeth of both elements are improperly located with respect to each of the common pitch circles 62 and 63 to serve for purposes of gearing. Because the teeth of the sleeve 35 are used only for axially sliding splined engagement with teeth of complementary shape in the planetary gearing of the change speed hub, this pitch circle relationship for gearing purposes is immaterial. It has the important advantage, however, of permitting both the coarse spline teeth 38 and the fine spline teeth 36 to be formed simultaneously in a single machining operation by the cutting tool 58.

While we have shown what we believe to be the best embodiment of our invention, it will be apparent to those skilled in the art that various modifications may be made therein without departing from the spirit and scope of the invention as defined in the appended claims.

The embodiments of the invention in which an exclusive property or privilege is claimed are defined as follows:

1. The method of simultaneously forming two sets of spline teeth on a workpiece, said teeth having a common pitch circle, the product of the number of teeth in each set multiplied by the circumferential spacing of said teeth measured along said pitch circle being equal for both sets, and the number of teeth in one set being different from the other set, a circle circumscribing the tips of the teeth of one set having a diameter different from that of a circle circumscribing the tips of the teeth of the other set, said method comprising the steps of axially reciprocating a cutting tool having sets of complementary cutting teeth, both sets of cutting teeth having pitch circles of equal diameters, the product of the number of teeth in one set multiplied by the circumferential tooth spacing measured along its pitch circle being the same for each set but different from the corresponding product for the teeth to be formed, and rotating said tool and said workpiece in unison during said reciprocating step, the speed of said rotation causing the circumferential velocities of the pitch circles of said workpiece and said cutting tool to be equal and opposite.

2. The method according to claim 1, wherein said reciprocating and rotating steps are performed to produce a sleeve wherein there is a series of coarse teeth located exteriorly of said common pitch circle and a series of fine teeth located interiorly thereof.

No references cited.

WILLIAM W. DYER, Jr., *Primary Examiner.*

G. A. DOST, *Assistant Examiner.*